March 14, 1933.  D. CARPENTER  1,900,910
AUXILIARY TREAD FOR TRACTORS
Filed Dec. 9, 1931  2 Sheets-Sheet 1
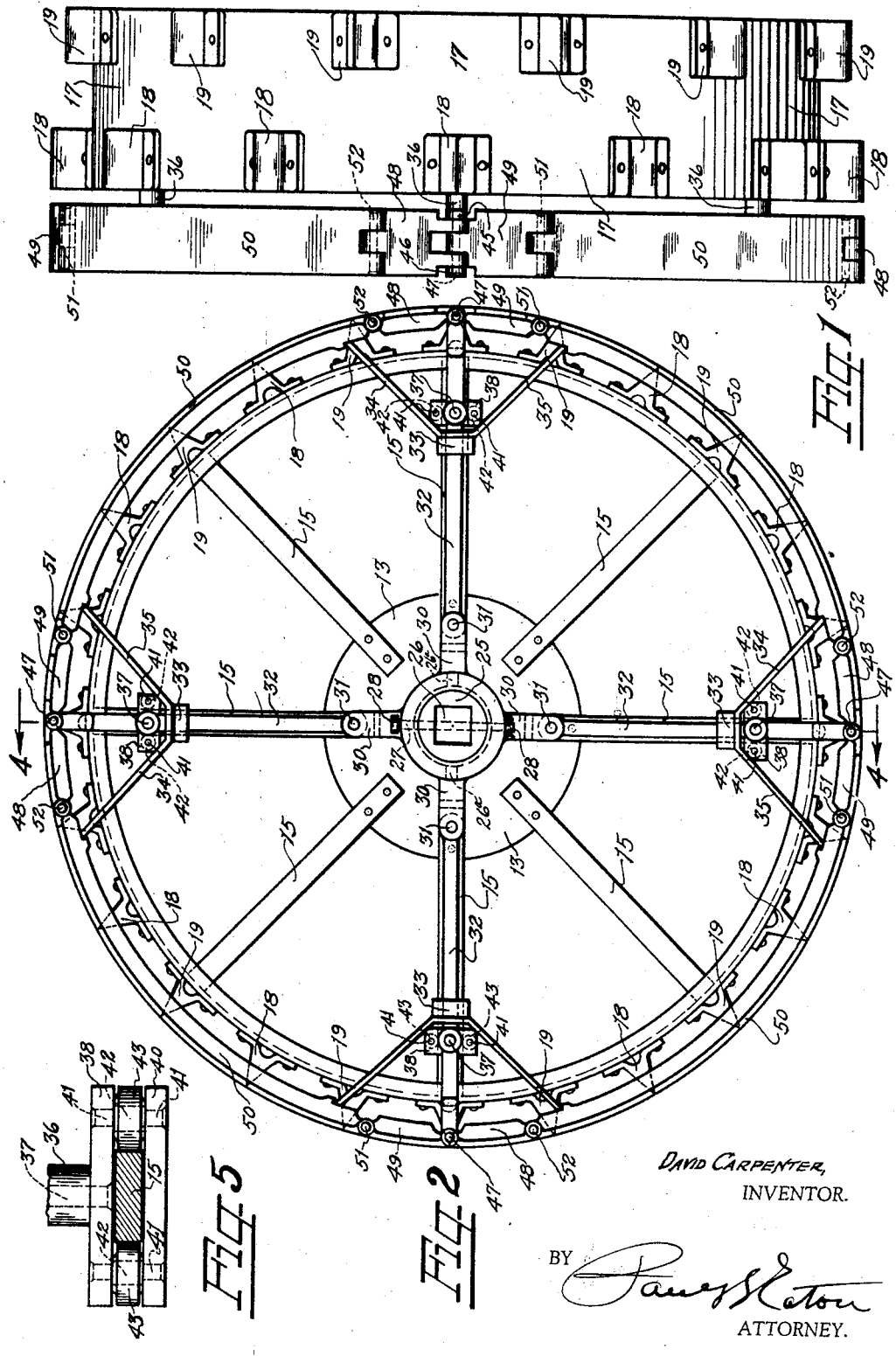
DAVID CARPENTER,
INVENTOR.
BY
ATTORNEY.

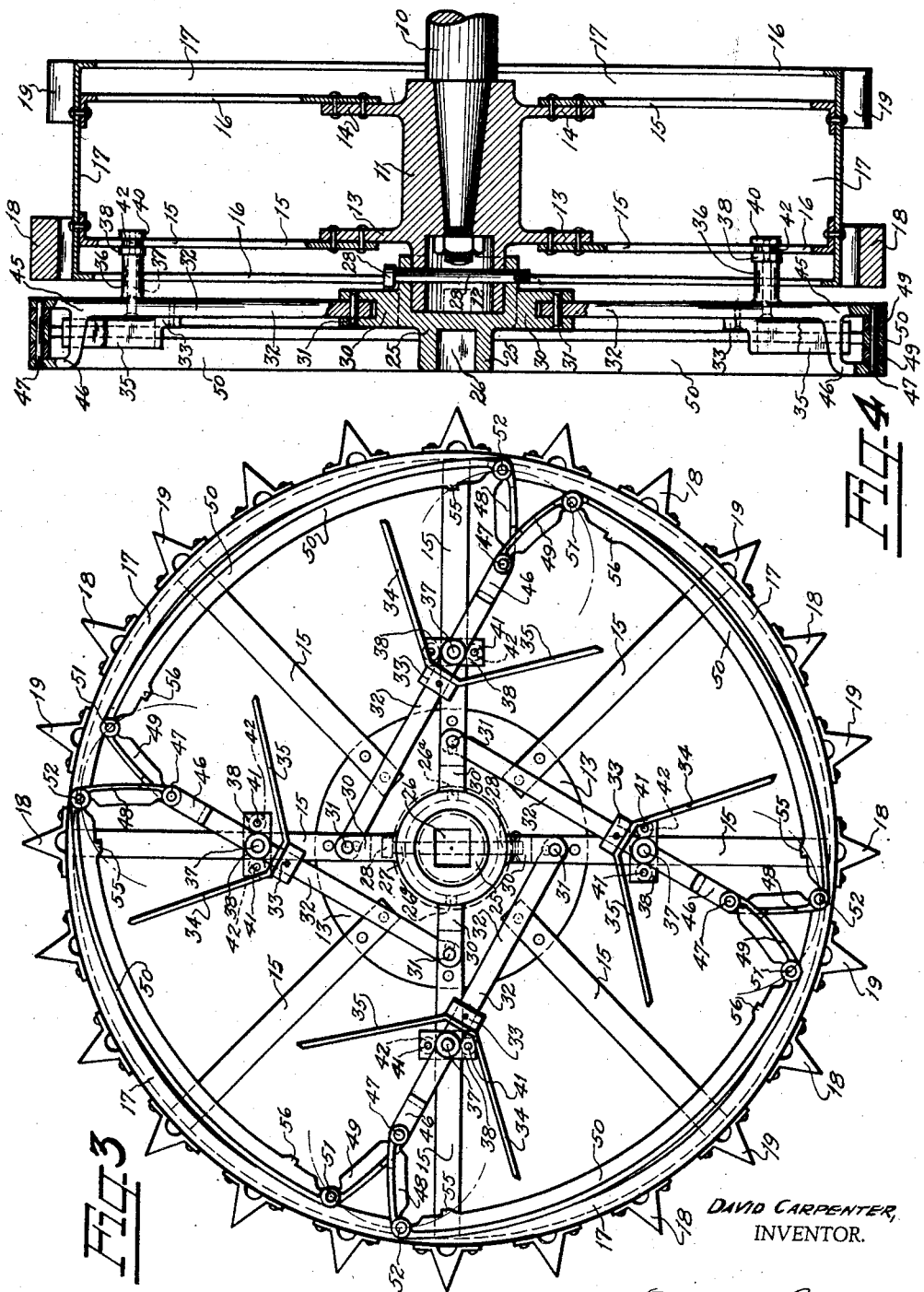

Patented Mar. 14, 1933

1,900,910

UNITED STATES PATENT OFFICE

DAVID CARPENTER, OF CHERRYVILLE, NORTH CAROLINA

AUXILIARY TREAD FOR TRACTORS

Application filed December 9, 1931. Serial No. 579,844.

This invention relates to an auxiliary traction device adapted to be secured to the wheels of tractors so that said tractors may be propelled along all roads without violating State laws forbidding the operation of tractors along certain roads where said tractors have cleats thereon.

It is a well known fact that tractors for use on farms and roadways having a soil surface must be provided with cleats to enable the tractor to have the proper amount of traction. With cleats secured on the tread of the wheels of the tractor, it is impossible to propel the tractors along highways having hard surface thereon without violation of the State laws on account of the fact that the cleats will injure the hard surface of the roadway.

It is an object of this invention to provide an additional traction surface which can be withdrawn from contact with the ground or road surface when it is desired that the cleats engage the ground, but said additional traction surface can be extended to form a traction member having a greater circumference than the circumference of the regular traction wheel with the cleats thereon so as to support the weight of the tractor while the same is being propelled along highways on which tractors having cleats thereon are forbidden.

It is evident that this invention can be applied to wheels of vehicles other than tractors, such as mowing machines and any other vehicles, if desired.

Some of the objects of the invention having been stated, other objects will appear as the description proceeds when taken in connection with the accompanying drawings, in which—

Figure 1 is an elevation of Figure 2, looking from the right hand side thereof;

Figure 2 is an elevation of a tractor wheel equipped with the additional traction means shown in expanded position;

Figure 3 is a view similar to Figure 1, but showing the additional traction surface and associated parts in folded position;

Figure 4 is a vertical sectional view taken along the line 4—4 in Figure 1;

Figure 5 is a detail view showing the means for slidably securing the foldable elements on the spokes of the tractor wheel.

Referring more particularly to the drawings, the numeral 10 indicates the rear axle of a traction engine on which is mounted a hub 11 said hub being hollowed out as at 12, and said hub also having projections 13 and 14 to which are secured spokes 15 and 16 and on the outer ends of these spokes the rim 17 is secured, having cleats 18 and 19 thereon.

Rotatably secured on the end of hub 10 is a member 25 having a socket 26 therein for the reception of a wrench for turning member 25 on hub portion 11. This hub portion 25 has two sets of holes 26a and 27 therein located at right angles to each other and thru a pair of these holes 26a or 27 as the case may be a pin 28 is adapted to be inserted which pin also passes thru a pair of opposed holes in the end of hub portion 11.

Projecting from hub portion 25 are the four arms 30 in each of which is pivotally secured as at 31 a link 32 which has secured thereon member 33, having outwardly projecting portions 34 and 35. Each of links 32 has an inwardly projecting portion 36 which is penetrated by a pin 37 which is also secured to plate 38 so as to permit pivotal movement of link 32 on pin 37. Plate 38 also slidably engages spoke 15 and on the other side of spoke 15 is another plate 40, the two plates being connected together by means of rivets 41 on each side thereof having an enlarged central portion 42 to separate the plates and to prevent their binding on the spokes 15, and a roller 43 is mounted on this enlarged portion on each side of the spokes 15.

One end of each of members 32 has the forked portions 45 and 46 in which is disposed a pin 47, and pivotally mounted on pin 47 are links 48 and 49, the other end of said links being secured to a traction member 50, there being four of these traction members 50 disposed between the sets of spokes or one traction member 50 between each set of links 32, and similar reference characters will apply to all of the four links 32 and associated parts. The members 48 and 49 are connected to these traction members 50 in a pivotal manner as at 51 and 52.

Each of traction members 50 has, near its ends, projections 55 and 56 against which the ends of members 34 and 35 are adapted to rest when the parts are in the position shown in Figure 2.

In the position shown in Figure 1, the traction members 50 and links 48 and 49 are shown in expanded position forming a traction surface which prevents the cleats 18 and 19 from engaging the surface on which the tractor is moving. When it is desired to remove the auxiliary traction surface from engagement with the ground or road surface on which the tractor is resting, then a wrench is inserted in cavity 26 and member 25 is given a quarter turn in either direction which causes the parts to assume the position shown in Figure 3 and pin 28 is inserted thru another set of holes in member 25 and thru the same set of holes in hub 11 and this holds the additional traction surface in folded position and out of engagement with the surface on which the tractor is resting.

In the drawings and specification, there has been set forth a preferred embodiment of the invention and although specific terms are employed, they are used in a generic and descriptive sense only and not for purposes of limitation, the scope of the invention being set forth in the appended claims.

1. In a tractor having conventional wheels provided with a hub and also provided with cleats on the rim portion thereof, an auxiliary traction device comprising a rotatable member on said hub, a traction surface formed of a plurality of arc-shaped members pivotally connected together end to end, a plurality of links having their outer ends connected to some of said arc-shaped members and said links having their other ends pivotally connected to said rotatable member, means on the rotatable member whereby the same may be rotated a partial revolution to contract said auxiliary tread.

2. In a tractor wheel having spokes, a rim and hub member, a rotatable member on said hub member, a plurality of radially slidable links pivotally secured in spaced relation on said rotatable member, means for slidably and pivotally mounting said links on the spokes of said wheel, an auxiliary tread formed of sections, each section having at each end a connecting link pivotally connected at one end to an end of the section and being pivotally connected at its other end to the outer end of one of said radially slidable links, and means for adjusting said rotatable hub member in position on said hub member to hold the sections in position.

3. An expansible tread for a tractor wheel having spokes comprising a plurality of tread members pivotally connected to each other at their ends, means slidably mounted on the spokes of the tractor wheel for supporting the tread members, and means mounted on the hub of the tractor wheel for moving said supporting means and the tread members to form an auxiliary tread having a circumference greater than the circumference of the tractor wheel.

In testimony whereof I affix my signature.

DAVID CARPENTER.